United States Patent [19]

Patrick et al.

[11] 4,212,575
[45] Jul. 15, 1980

[54] VACUUM SEALED MANIPULATOR

[75] Inventors: E. Vincent Patrick, Lorton; Howard K. Dickson, Alexandria, both of Va.

[73] Assignee: The United States of America as represented by the Secretary of the Army, Washington, D.C.

[21] Appl. No.: 930,437

[22] Filed: Aug. 2, 1978

[51] Int. Cl.² .............................................. B65J 1/10
[52] U.S. Cl. .................................. 414/8; 294/103 R; 414/744 A
[58] Field of Search ................... 414/1, 8, 744, 744 A; 294/103

[56] References Cited

U.S. PATENT DOCUMENTS

| | | | |
|---|---|---|---|
| 3,261,242 | 7/1966 | Peters | 294/103 R X |
| 3,332,392 | 7/1967 | Gessner et al. | 414/744 X |
| 3,890,552 | 6/1975 | Devol et al. | 414/1 X |

Primary Examiner—Robert G. Sheridan
Attorney, Agent, or Firm—Nathan Edelberg; Robert P. Gibson; John E. Holford

[57] ABSTRACT

The invention provides one or more externally controlled manipulators for a generally circularly cylindrical vacuum chamber; which manipulators are capable of small precision translations in three orthogonal directions and can grasp and transport a sample around the chamber on a circular path, rotate the sample 180° about a radius of the path and after releasing the sample into a chamber fixture for storing, processing and/or testing is free to address other samples.

10 Claims, 4 Drawing Figures

VACUUM SEALED MANIPULATOR

The invention described herein may be manufactured, used, and licensed by the U.S. Government for governmental purposes without the payment of any royalties thereon.

BACKGROUND OF THE INVENTION

A unique vacuum chamber arrangement is disclosed in patent application Ser. No. 930,264 (EPA No. 1876) filed on Aug. 2, 1978 by E. Vincent Patrick et al for a "Method and Apparatus to Fabricate Image Intensifier Tubes." This method involves a more complicated manipulation of the tube parts or samples within a sealed processing chamber than has been the practice in the art. The design of the sealed chamber also introduces certain constraints that make manipulation of the samples more difficult than in a standard chamber. The method further involves more simultaneous processing stages in a multi-chambered system than has been the practice in the past. Vacuum feedthroughs are commercially available which provide translation and rotation, however, the sophistication of such feedthroughs is insufficient to meet the manipulation requirements of the method and apparatus set forth in the above patent application.

BRIEF DESCRIPTION OF THE INVENTION

An object of the present invention, therefore, is to provide a vacuum manipulator for transporting the parts of a vacuum tube in serial fashion between a series of stations in a vacuum chamber. A further object is to provide a manipulator which can deposit a part at one station to free the manipulator to pickup a second part or sample at another station. Still another object is to provide a manipulator which can invert or provide a complete revolution of a part to facilitate its processing or inspection. Finally, it is an object of the invention to provide a manipulator which can change its configuration to avoid obstacles presented by walls and appendages within the chamber as the manipulator moves about the chamber.

BRIEF DESCRIPTION OF THE DRAWINGS

These and other objects of the invention will best be understood with reference to the accompanying drawings wherein.

DESCRIPTION OF THE INVENTION

Figure 1:
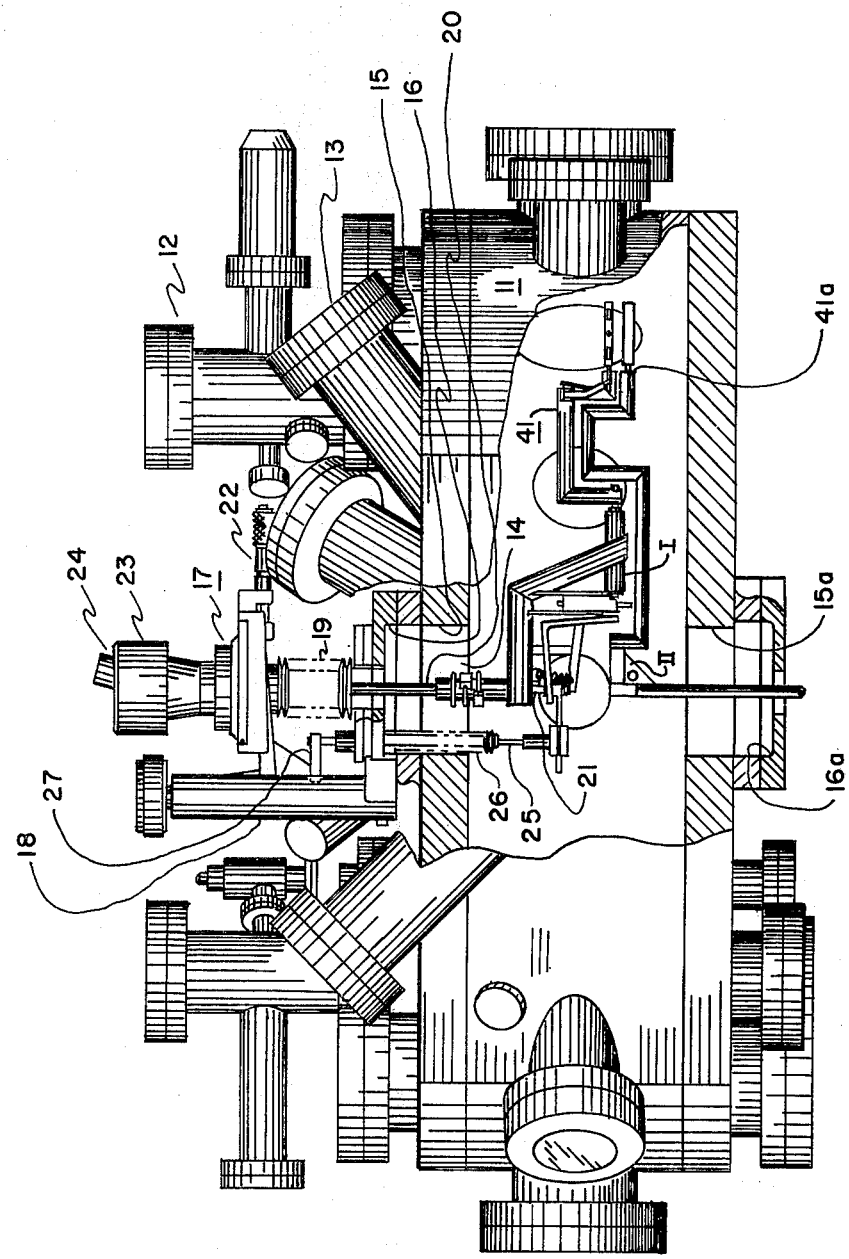
FIG. 1 shows a cutaway side view of a typical vacuum chamber with the two manipulator system of the present invention mounted therein.

Referring specifically to FIG. 1 there is shown a vacuum chamber 11 containing a myriad of viewing and/or access ports like ports 12 or 13, comprising metal tubes with hermetically sealed glass covers, entering at various angles. The chamber has a generally circularly cylindrical shape with a diameter usually several times its height. To accommodate a first manipulator, a circular opening 14 is provided coaxially through the generally circular chamber top wall and an exterior coupling flange 15 with a mating opening is welded to that wall. A second opening 15a and flange 16a may be provided, coaxially with the first, on the bottom wall of the chamber, if a second manipulator 41a is desired, advantages of this will be explained at FIGS. 3 and 4. The flange is a standard sealing type with a knife edge groove and copper gasket (not shown) to mate with a similar flange 16 on a Model 981-0536 High Precision Manipulator head 17 commercially available from the Vacuum Division of Varian Corporation, 611 Hansen Way, Palo Alto, CA 94303[1]. A screw type jack 18 mounted on the flange 16 raises and lowers the remainder of the manipulator about one and a half inches; the manipulator, meanwhile, remains sealed to the flange through a bellows 19. Movement of a sample within the chamber is controlled through a first hollow shaft 20 and a second solid coaxial shaft 21 inside the first. The bellows permits an x-y movement of these shafts normal thereto of 25 mm controlled to a precision of at least 0.1 mm by micrometers like device 22. The first outer shaft is freely rotatable in either direction by means of knob 23. A screw jack actuator 24 having its own bellows seal serves to provide a movement of about 10 mm of the solid shaft 21 relative to the outer shaft 20. The remaining structure within the chamber attached to shaft 20 is specific to the present invention. Using the same basic feedthrough, an additional shaft 25 is mounted through flange 16 for axial movement only. The vacuum seal again is preserved by a long slender bellows 26 which is vacuum sealed to the flange 16 and to shaft 25 and which allows the latter an axial movement of about two inches. The purpose of this shaft will be apparent presently.

[1] Instruction Manual, High Precision Manipulators, 87-400 280, October 1971

Figure 2:
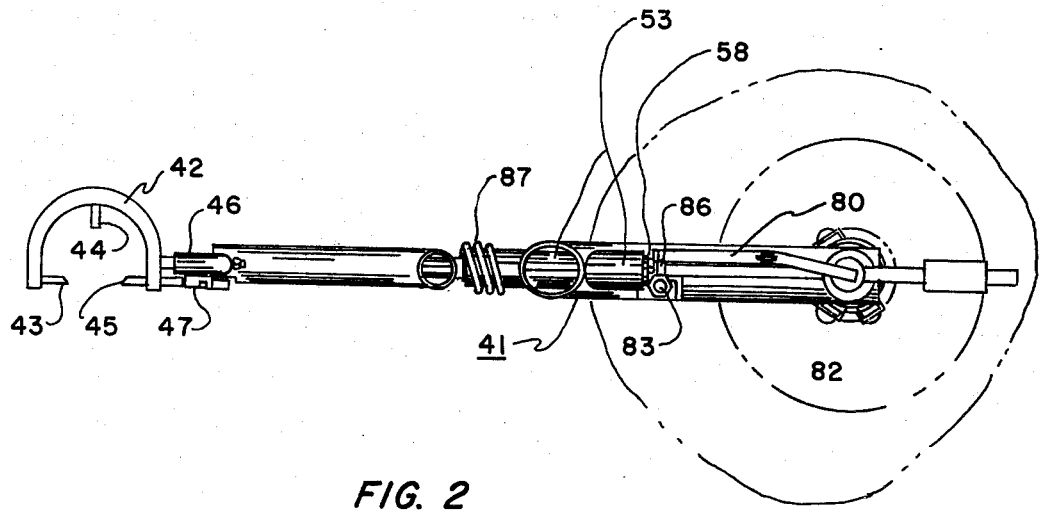
FIG. 2 is a bottom view of one manipulator alone.

FIG. 2 shows a bottom view of the manipulator in the chamber. In general it consists of a boom 41 attached to the outer shaft 20 from FIG. 1. At the end of the boom is a c-shaped sample holder 42. For round samples such as the faceplates and the tube bodies of image intensifiers, two fixed teeth 43 and 44 comprising insulated set screws threaded through the holder at the center and one end and a third tooth 45 slideably mounted through the opposite end provide an adjustable three point contact. The holder also has a stem portion extending parallel to the tooth 45 which fits into a small diameter tubing elbow 46. Clearance is provided between the holder stem and the tubing elbow so that orthogonal sets of opposed set screws threaded through the walls of the latter (not shown) can be used to coaxially align the sample holder and level it in fixed relation to rest of boom 41. The tooth 45 has an attached endpiece 47 which rides lightly against the outer surface of the small elbow. The length of the teeth 43–45 and the slope of their end faces may be selected to match the contour of the samples or vacuum tubes transported by the manipulator. The endpiece 47 has a notch in its outer edge to engage the tip of a release arm.

The three teeth are preferably tipped with glass, while the set screws and holder are stainless steel. The glass teeth insulate the sample from the holder so that voltages can be applied to the sample, either from contacts mounted on fixtures in the chamber or by contacts (not shown) on the sample holder which in turn connect to terminals 30 which come with the manipulator head and turn with shaft 20. The high coefficient of friction of glass makes for positive pickup of samples without risk of fusing the teeth and sample at high bake-out temperatures in the chamber. The metal endpiece 47 is fused to the sliding tooth by a glass to metal seal and the fixed tooth tips may be similarly attached to their set screws. As is the case for all sliding surfaces of the manipulator, the slideable tooth and the endpiece are lubricated with a bonded molydisulfide dry film.

Figure 3:
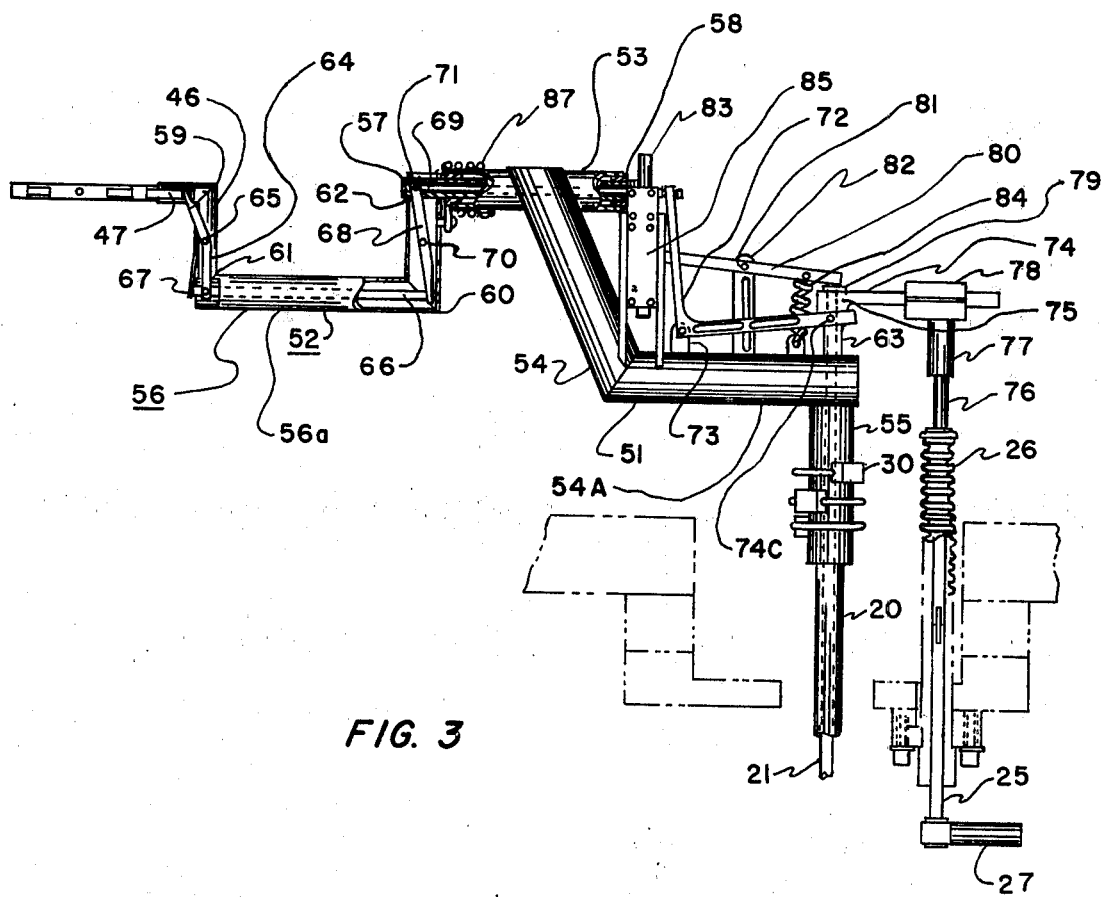
FIG. 3 is an inverted side view of a first embodiment of the manipulator in FIG. 2 with portions broken away to show their inner mechanisms.

FIG. 3 shows a side view of the mechanical structure of the boom 41 from FIG. 2. It is shown inverted as compared with FIG. 1, as it might appear when mounted through a basic feedthrough in the bottom wall of the chamber. The boom consists of two subsections; a main frame 51 and a rotating frame 52. The main frame has three integrally connected or welded structural elements; a spindle housing 53, a 115° elbow 54, and a stem 55. The stem is attached to the shaft 20 by set screws (not shown) according to the usual practice in the art. The horizontal leg 54A of elbow 54 and spindle housing 53 are arranged so that their axes substantially intersect the axis of shafts 20 and 21 at a right angle. The main frame serves as the mounting base for the various lever arms and other moving parts to be described. The rotatable frame consists of the small elbow 46, an intermediate elbow 56 and a spindle 57. The latter is coaxially aligned at each end of the spindle housing 53 by means of bearings 58, preferably ball bearings designed to withstand baking temperatures. As the spindle is rotated the sample and holder also rotate and the leg 56a is repositioned vertically. The axis of the holder may be offset from the spindle, if a greater vertical shift of the sample is required than adjustments of shaft 20 can provide, or merely for convenience of operation.

All elements of the main and rotating frame are constructed of stainless steel tubing. The objective is maximum rigidity for the boom with minimum mass, so that the vibrations of the holder due to impulses transmitted to the boom are of minimum amplitude. Suitable dimensions for the boom configuration are approximately one foot from the axis of shaft 21 to the center of the sample holder. Allowing for a deflection of 0.002 inches at the sample, the spindle housing 53 and stem 55 can be made from 0.50 inch tubing with 0.030 inch wall thickness and the 115° elbow from 0.75 inch tubing with 0.025 in wall thickness. The resultant deflection is due mainly to the strain of shaft 20. The rotatable frame is formed from progressively smaller diameter tubing such as 0.375 inch for elbow 56 and 0.25 for elbow 46. The wall thickness may be the same or somewhat less those previously indicated. This provides adequate strength and a smaller bending moment for the boom. The small elbow 46 and the intermediate elbow 56 are formed by mitreing the ends of the legs and welding them at corner seams 59 and 60. One leg of each is then joined to the other by drilling a hole in the larger diameter leg to just accommodate the smaller and then welding around the edges of the hole. The same technique is used to join the spindle 57 to the remaining leg of elbow 56 as at seam 62. A similar technique is also used to weld the stem to the 115° elbow. Since the shafts 20 and 21 on the manipulator head are too short for the present application the solid shaft has an extension welded to its end. A similar extension 63 is welded into one end of stem 55. The leg of elbow 51 is then drilled on opposite sides for the two different diameters of tubings 63 and 55 which are then inserted and welded to that elbow. The remaining end of stem 55 is free to slide over shaft 20 as previously stated and secured by set screws for easy removal and maintenance.

Returning to the sliding tooth 45, the release mechanism which withdraws this tooth to disengage a sample will now be described. The tooth can be withdrawn at any position of the manipulator. The end piece 47 has a slot which engages the end of a secondary lever 64. This lever pivots on a pin 65 midway of the vertical leg of small elbow 46. The pin is provided with a retaining clip (not shown) which holds the lever thereon and is lubricated with bonded molydisulfide. The lever is bent so that the endpiece 47 will not extend into the offset section of the boom when retracted. The surfaces of contact between the secondary lever and the endpiece are curved so that there is no bending moment on the glass tooth during actuation. The secondary lever is pinned at its remaining end to one end of a secondary rod 66 which extends into the horizontal leg 56a of elbow 56. The intersecting legs at joint 61 are machined to accommodate the movement of the lever and the rod. The secondary rod projects slightly outside the leg 56a to engage one end of a leaf spring 67 which is spot welded at its opposite end to the center of the vertical leg of elbow 46 and biased to urge rod 66 into the horizontal leg of that elbow. The opposite end of rod 66 has a tongue which is inserted in an opening or groove in one end of a primary lever 68, the force of the leaf spring prevents the two from disengaging. Thus the only force exerted on the sliding glass tooth is exerted by the leaf spring. Three leaves of 0.012 inch thick Elgiloy were employed in the present invention to provide safe and reliable contact with the tube sample. The primary lever pivots on an axel 70 extending through the center of the vertical leg of elbow 56 and the opposite end of this lever is coupled by a similar tongue and socket 71 to primary rod 69. The remaining end of the primary rod has a rod tongue or reduced diameter portion defining an end buss of normal diameter. The tongue rests in a fork in the end of a vertical leg of an orthogonal lever 72, so that the primary rod is essentially coaxial with the hollow spindle 57. The orthogonal lever which also includes a horizontal leg is pinned to fulcrum tab 73 at the intersecting ends of these two legs. The legs are many times longer than the allowed axial displacement of the primary rod, so that it departs very little from its coaxial position during axial displacement. The round tongue is free to rotate in the fork as the rotatable frame turns on spindle 57 and the end boss allows the orthogonal lever to impart axial displacement of the primary lever to the right in the figure shown. The remaining end of the horizontal leg of the orthogonal lever is attached to the release arm 74 of a release actuator drive assembly. One end of the release arm 74 terminates in a collar 75 which slips over shaft extension 63 closely surrounding it so as to substantially limit release arm movements to axial translation or coaxial rotation about that shaft. The collar can have different forms as will be described at FIG. 4, but most simply it can have a circumferential groove into which a pin 74c extends. With the various rods and levers in the positions shown the tooth 45 is fully extended toward the center of the sample holder and the collar of arm 74 is located near the end of the extension 63 of shaft 20 away from elbow 51. To retract tooth 45 the collar is moved toward the elbow. This motion is translated from a shaft extension 76 of shaft 25 to the release arm by means of a bearing housing consisting of rotation and translation housing elements 77 and 78. Rotation element 77 is attached to shaft extension 76, preferably with a conventional sleeve type ball bearing which permits coaxial rotation only, and no translation between the two. One end of the rotation element terminates in a mating end section for the translation element which may exactly duplicate the latter. When fastened together about the release arm the end section and translation element capture the arm without interfering with its movement relative to shaft 20 as adjustments are made in the manipulation head. The release arm is made long enough to provide full engagement with the translation element, e.g. greater than the spacing of shafts 20 and 25 and the 25 mm adjustment provided by the manipulator head used herein. Atmospheric pressure on the bellows 26 is transmitted through shaft extension 76 to hold the elements in the position shown. A snap ring 79 at the end of the shaft extension 63 provides a limit stop for the collar and release assembly. There is sufficient play in the tongue and socket (or groove) joints at each end of secondary lever 68 to permit leaf spring 67 to seat the end of the secondary rod firmly against the elbow 56 and still have the tongues and sockets engaged when tooth 45 is held fully retracted by the largest sample which can be accommodated. An auxiliary compression spring (not shown) may be mounted between the collar 75 and the elbow 51, if the atmospheric pressure is too low for proper operation or a bellows of very small cross-section is used.

Control of the rotatable frame 52 is provided through lever arm 80 connected at its center by pin 81 to a long fulcrum tab 82. One end of this lever contains a socket which engages a ball on the end of shaft 21 in the chamber and the opposite end engages a pin (not shown) on rack element 83. A tension spring 84 clamps the shaft end of the lever to shaft 21. As the lever moves with this shaft the rack slides freely through rack housing 85 on ball bearing guides (not shown). The end of the spindle 57 in this housing has an integral spur gear 86 which engages the rack to turn the spindle in the usual fashion well known in the art.

Rack housing 85 is a two piece linear bearing housing, the pieces being similar to the upper housing element 78 in the sample release machanism. the rack is machined from a rod of circular cross-section which is supported at two well spaced axial positions at three points by ball bearings substantially evenly spaced around the circumference. Loading and stop screws (not shown) are mounted in the rack housing to position the bearings for proper engagement of the pinion under load and to engage a suitable groove or projection provided in the rack to limit pinion motion to 180°. The pinion may be center drilled to either the inner or outer diameter of the spindle and welded, pinned, keyed or otherwise integrally attached to the spindle. A torsion spring 87 between the spindle housing and the spindle compensates for any play between the rack, pinion and rack lever 80, so that the sample holder is rigidly fixed at any set position. It is preferred that the pinion diameter and rack displacement be chosen to supply little more than 180° of rotation, since any greater rotation makes adjustment more difficult and can always be achieved, if required, by releasing the sample in a fixture and reengaging it at the zero angle or level position to which the holder returns automatically when the handle 27 is released.

In addition to rotating the sample the above assembly also varies the vertical position of the horizontal leg of elbow 56 in the offset section of the boom. In one instance the boom has been required to lift a tube part over a wall and insert it in a workspace between the jaws of a press, the workspace being lower than the top of the wall. Rotation of the offset portion provided the necessary clearance between the wall and the boom.

The use of the 115° elbow provides a clearance above the rack lever 80 coaxial with the spindle housing which can be made large enough to accommodate the spindle housing of a second manipulator. Two such spindle housings I and II are indicated in FIG. 1. When two manipulators are thus aligned the booms can be configured to provide directly opposed parallel sample holders with four standard spacings three of which may be independent or the four of which may be linearly progressive. The sample holders may thus hold a stack of two or more parts, such as the tube body and two endplates of an image intensified tube, in proper assembly sequence, by grasping the top and bottom parts; and the rotatable frames can revolve the stack about its axis more than 180°. The zero angle or level positions of the holders will, however, be determined by the offset structures in the boom, so that the offset of boom 41a in FIG. 1 around the spindle housing I might better be in the horizontal plane for the level position of the sample holder.

Figure 4:
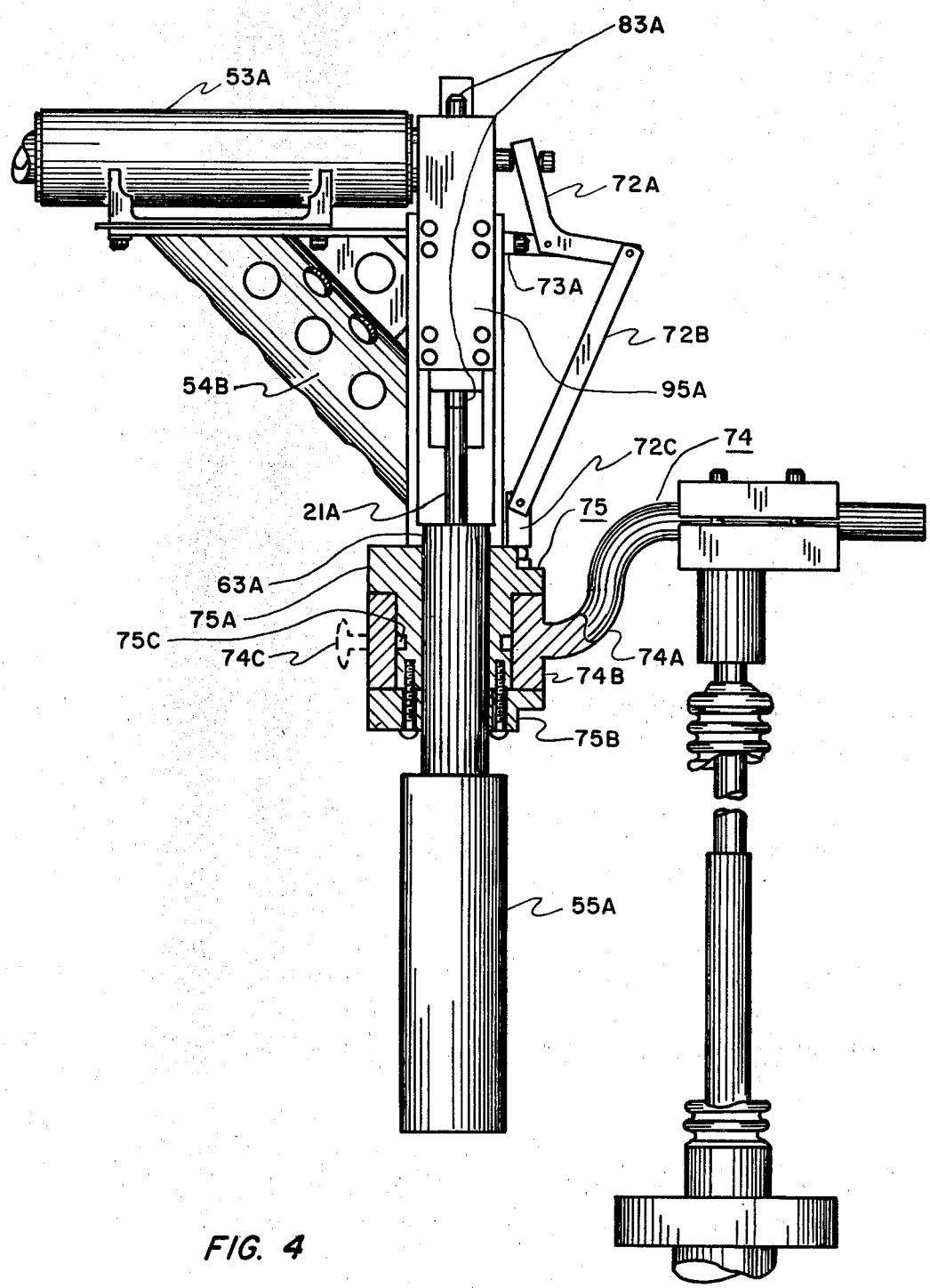
FIG. 4 shows a side view of a second embodiment of a manipulator which may be used with the first in the same chamber.

A second manipulator that might be used instead of the FIG. 3 device or in a two manipulator configuration is shown in FIG. 4. In this configuration the rack housing 95a is mounted directly to the end of the shaft 20 or an extension 63a thereof and the rack 83a is connected coaxially to the end of shaft 21. The orthogonal lever 72a performs the same function as lever 72 in FIG. 3, but it is now pivoted on a fulcrum tab 73a on the rack housing. An additional link 72B and a terminal tab 72c connect the lever to the collar 75. A portion 74a of arm 74 may be bent either up or down as shown to simplify the coupling between shafts. An alternate collar structure is shown in FIG. 4. An inner drive spool 75a with a removeable end piece 75b is integrally attached to the terminal tab 72c and these two parts capture a rotatable collar ring 74b which is an integral part of arm 74. In the FIG. 3 structure arm 74 may be connected to the spool and the pin 74c from FIG. 3 to the collar ring, or either may be reversed. And, of course, any of the above connections might be made to end portion 75b. Further, the end portion 74b can be omitted by providing a groove 75c into which the pin (or set screw) 74c can project, preferably with two or more similar screws spaced at equal angles around the periphery of the ring. The spool could then be reduced to a simple grooved sleeve having the same axial dimension as the collar ring. A corner brace 54b replaces the 115° elbow as a support for the spindle. This should be rigid but light weight as indicated by the many apertures formed therein. Note that this manipulator can rotate continuously about shaft 21.

Another desireable feature would be to have the spindle housing centered over the shafts 21 and 20. This could be accomplished by one skilled in the art by simple rearrangements of the linkages set forth herein. Other variations of the above structures will be obvious to those skilled in the art, but the invention is to be limited only by the claims which follow.

We claim:
1. A manipulator system for transporting a sample between work stations in a substantially cylindrical vacuum chamber of generally circular cross-section with a central axis normal to said cross-section comprising:
  a first boom pivoted at a first end for rotation parallel to said cross-section about a boom axel parallel to said central axis;
  said boom having a spindle housing and a spindle housing and a spindle jornalled therein rotatable only about the longitudinal axis of said boom;
  a frame member attached to said spindle;
  a sample holder attached to said frame; and
  a first external control means vacuum sealed through a first circular wall of said chamber and attached to said first boom axel to translate said boom axel independently in three orthogonally related directions and to rotate said boom and frame independently about said boom axel and spindle axes, respectively.

2. A manipulator system according to claim 1 wherein:
  said sample holder includes at least one moveable tooth slideably mounted thereon for engaging said sample; and
  a second external control means sealed through said first wall and coupled to said boom to independently move said tooth equally in any position of said boom.

3. A manipulator system according to claim 1 wherein:
  said frame is mounted between said spindle and said sample holder and a first offset portion of said frame is parallel to but spaced from said spindle axis.

4. A manipulator system according to claim 1 wherein:
  said boom includes a second offset portion mounted between said boom axis and said spindle which is parallel to but spaced from said spindle axis.

5. A manipulator system according to claim 1 wherein:
  said sample holder is parallel to but spaced from said spindle axis.

6. A manipulator system according to claim 1 wherein:
  a second boom is pivoted parallel to said cross-section between said first boom and a second wall of said chamber; and
  a second external control means is vacuum sealed through said second wall and coupled to said second boom, said second control means having the same functions as said first control means.

7. A manipulator system according to claim 6 wherein:
  said second boom includes a second spindle all portions of which located closer to said boom axel than said first spindle, whereby said spindles may be placed in coaxial relationships.

8. A manipulator system according to claim 6 wherein:
  a second sample holder is mounted on said second boom, each sample holder being parallel to and spaced an equal distance from the spindle axis of its attached boom.

9. A manipulator system according to claim 6 wherein:
  a second sample holder is mounted on said second boom each sample holder being spaced a different distance from its spindle axis.

10. A manipulator system according to claim 2 wherein:
  said second external control means includes a displaceable rod and vacuum sealing bellows having a fixed axis with respect to said chamber and a coupling means connecting said rod and said boom to impart only relative axial translation to a portion of the boom.

* * * * *